United States Patent [19]

Tatami

[11] 4,258,384
[45] Mar. 24, 1981

[54] COLOR VIDEO SIGNAL PROCESSING SYSTEM

[75] Inventor: Mitsushige Tatami, Ebina, Japan

[73] Assignee: Sony Corporation, Tokyo, Japan

[21] Appl. No.: 97,781

[22] Filed: Nov. 27, 1979

[30] Foreign Application Priority Data

Nov. 30, 1978 [JP] Japan .................................. 53-148416

[51] Int. Cl.³ .......................... H04N 5/92; H04N 9/499
[52] U.S. Cl. ........................................... 358/16; 358/8
[58] Field of Search ............................ 358/4, 8, 16, 21

[56] References Cited

U.S. PATENT DOCUMENTS 4,001,876  1/1977  Schiess et al. ............................ 358/8

Primary Examiner—Robert L. Richardson
Attorney, Agent, or Firm—Lewis H. Eslinger; Alvin Sinderbrand

[57] ABSTRACT

A PAL color video signal which is reproduced in a special mode, such as a slow, still or fast-forward or reverse mode is re-arranged in order to recover the standard signal sequence of the PAL color television system. In the case of the luminance signal component, two adjacent lines of reproduced video signals are mixed in order to avoid vertical shifting of the reproduced image if the numbers of a reproduced field and a reference field are different. In the case of the chrominance signal component, a phase-inversion and/or a signal delay of 1H interval are carried out in order to coincide the chrominance phase sequence of the reproduced PAL color signal with the sub-carrier phase sequence which is standard for the PAL color television system. The need for a phase-inversion and/or a signal delay is determined on the basis of an examination of a reproduced color field and a reference color field.

12 Claims, 5 Drawing Figures

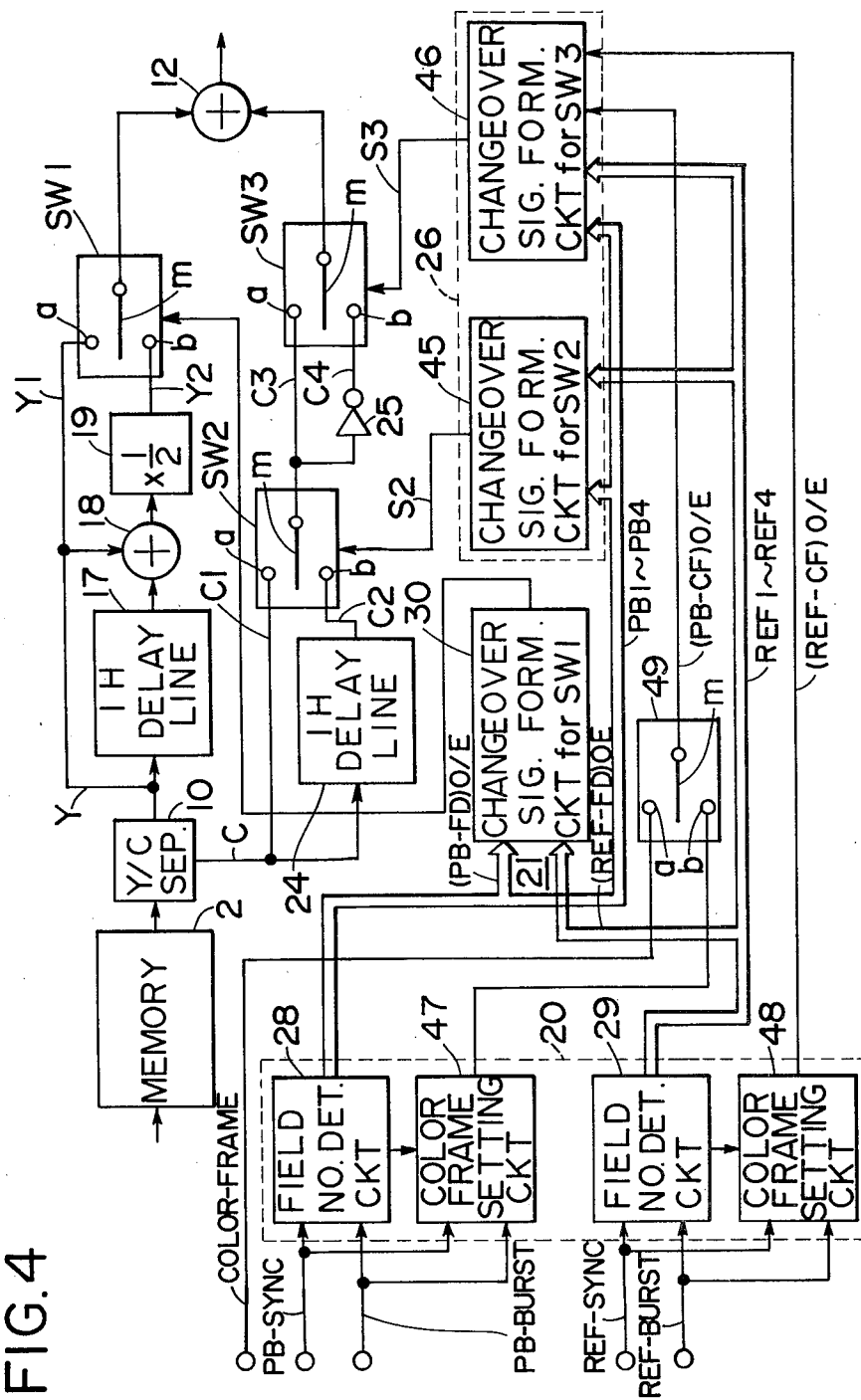

FIG.5

| FIELD NO. of REPRO. VIDEO SIG. | FIELD NO. of REF. VIDEO SIG. | INTERPOLATIVE CORRECTION for LUMINANCE SIG. | PHASE SEQUENCE CORRECTION for CHROMINANCE SIG. |
|---|---|---|---|
| F 1 | F 1 | — | $C'_n = +C_n$ |
|  | F 2 | (A) $Y'_n = \dfrac{Y_n + Y_{n+1}}{2}$ | $-C_{n+1}$ |
|  | F 3 | — | $-C_{n-1}$ |
|  | F 4 | (A) $Y'_n = \dfrac{Y_n + Y_{n+1}}{2}$ | $-C_n$ |
| F 2 | F 1 | (B) $Y'_n = \dfrac{Y_{n-1} + Y_n}{2}$ | $-C_{n-1}$ |
|  | F 2 | — | $+C_n$ |
|  | F 3 | (B) $Y'_n = \dfrac{Y_{n-1} + Y_n}{2}$ | $-C_n$ |
|  | F 4 | — | $+C_{n-1}$ |
| F 3 | F 1 | — | $+C_{n-1}$ |
|  | F 2 | (A) $Y'_n = \dfrac{Y_n + Y_{n+1}}{2}$ | $-C_n$ |
|  | F 3 | — | $+C_n$ |
|  | F 4 | (A) $Y'_n = \dfrac{Y_n + Y_{n+1}}{2}$ | $+C_{n+1}$ |
| F 4 | F 1 | (B) $Y'_n = \dfrac{Y_{n-1} + Y_n}{2}$ | $-C_n$ |
|  | F 2 | — | $-C_{n-1}$ |
|  | F 3 | (B) $Y'_n = \dfrac{Y_{n-1} + Y_n}{2}$ | $+C_{n-1}$ |
|  | F 4 | — | $+C_{n-1}$ | n: LINE NUMBER

COLOR VIDEO SIGNAL PROCESSING SYSTEM

BACKGROUND OF THE INVENTION

1. Field of this Invention

This invention relates to a signal processing apparatus for PAL color video signal, and particularly to such apparatus for processing PAL color video signals when obtained from a video tape recorder or the like in a so-called special reproducing mode.

2. Description of the Prior Art

A video sheet or disk recorder can play back or reproduce recorded video signals not only at normal speed but also in special reproducing modes, such as, still, slow, quick or fast reproducing modes.

Even helical scan video tape recorders have been provided with the ability to perform in such special reproducing modes by using an automatic head tracking system. In such system, a rotary magnetic head of the helical scan VTR is secured on a piezo-ceramic plate which is deflectable in response to a control voltage applied thereto. The piezo-ceramic plate is secured on a rotary disk around which the magnetic tape is wrapped and advanced. The reproducing mode of such VTR is substantially determined by the speed of movement of the tape. Thus, if the tape is stopped, the rotary magnetic head is moved upward or downward by the bi-morph leaf receiving a suitable control voltage in order to trace video tracks recorded on the tape while the latter was advanced at a standard speed. As a result, the same track is repeatedly scanned, and a still-motion picture or image is displayed. If the tape is advanced at twice the normal or standard speed, the magnetic head traces every other track on the tape, and the position of the head is again controlled by the control signal applied to the bi-morph leaf. Thus, still-mode and fast-mode reproductions are achieved.

In the above special reproducing modes, the sequence of the reproduced video signals is different from that of a standard television system. In the case where the VTR handles a NTSC color television signal, signal sequences of the reproduced video signals can be recovered without decoding the chrominance signal component. However, in the case where a PAL color video signal is handled in the VTR, it is necessary to decode the chrominance signal component and then to encode the chrominance signal in order to restore the correct signal sequence to the reproduced video signals.

OBJECTS AND SUMMARY OF THE INVENTION

Accordingly, it is an object of this invention to provide a signal processing apparatus for a PAL color video signal reproduced in a special reproducing mode.

Another object is to provide a signal processing apparatus for recovering the standard signal sequence of a PAL color video signal when such signal sequence is lacking in the reproduced signal.

In accordance with an aspect of this invention, when the field number of the reproduced video signal is different from a reference field number, luminance signals of two adjacent horizontal scanning lines are mixed to prevent the alternately upward and downward shifting of the displayed picture that would otherwise occur.

In accordance with another aspect of this invention, the chrominance phase sequence is recovered without the use of signal decoding and encoding devices, and merely through the use of a chrominance signal sequencer which includes a 1 H delay circuit and a phase-inverting circuit.

Correction of the sequence of the chrominance phase takes precedence over the signal contents in the phase sequencer, so that the composite PAL color video signal which recomposed through the sequencer may include luminance and chrominance signal components which differ from each other, in their contents, by an interval of one horizontal scanning period.

Preferably, the sequencer is controlled in association with the control of a time base corrector.

The above, and other objects, features and advantages of the present invention, will be apparent from the following detailed description which is to be read in conjunction with the accompanying drawings.

BRIEF DESCRIPTION OF THE DRAWINGS

FIG. 4 is a block diagram of a detecting circuit and a change-over control circuit also included in the apparatus of FIG. 2; and FIG. 5 is a table to which reference will be made in explaining the interpolative corrections of the luminance signal and the phase sequence corrections of the chrominance signal which are effected in accordance with this invention.

DESCRIPTION OF A PREFERRED EMBODIMENT

Figure 1:
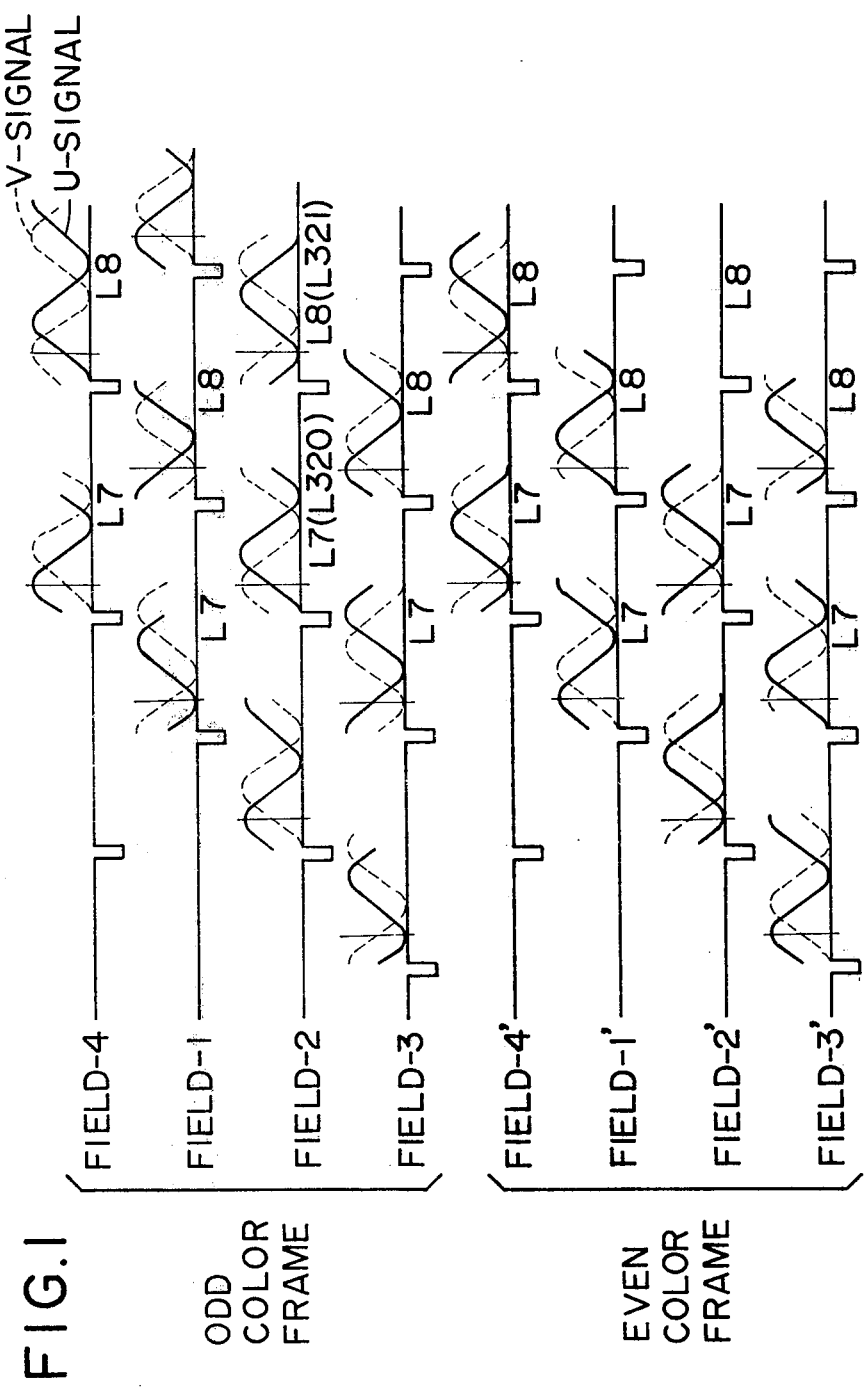
FIG. 1 shows illustrative waveforms of a standard PAL color video signal and to which reference will be made in explaining the phase relationships between each synchronizing signal and the chrominance signal components.

FIG. 1 shows waveforms of horizontal synchronizing signals and chrominance signals of a standard PAL color television signal for each field, and serves to clarify the phase relationships of the signals. As shown in FIG. 1, the horizontal synchronizing signal in an odd field has a phase difference of one-half of a horizontal scanning period (H/2) from that of the horizontal synchronizing signal in an even field. The PAL color television system employs an interlaced scanning scheme in which a single frame of the video signal includes two fields of video signals. The chrominance signal includes a U-signal component, shown by solid lines, and a V-signal component, shown by dotted lines, with a color sub-carrier $f_c$ being modulated by such components. These U-signal and V-signal components have a phase difference of $\pi/2$ in respect to each other. The V-signal component alternately leads and lags by $\pi/2$ in phase relative to the U-signal component successive in fields. The U-signal component includes B-Y chromaticity, and the V-signal component includes R-Y chromaticity.

The frequency $f_c$ of the color sub-carrier is represented by:

$$f_c = (284 - \tfrac{1}{4})f_H + 25 \text{ (Hz)} \tag{1}$$

where $f_H$ is the horizontal scanning frequency. Accordingly, the number N of waves of the color sub-carrier included in 1 H period is represented by:

$$N = (283 + \tfrac{3}{4} + 1/625) \tag{2}$$

Therefore, if it is assumed that the phase of the U-signal at a fixed point on a horizontal scanning line L7 in a Field −1 is as shown in FIG. 1, then the U-signal on the next line L8 in the same field will show a phase lead of about $3\pi/4$ or a phase lag of $\pi/4$. The U-signal on the line L320 in the next Field −2 which is adjacent line L7 will show a phase lead of $\pi/4$. Further, the U-signal shows a phase lead of $3\pi/4$, or a phase lag of $\pi/4$, on the line L7 in the Field −3 of the next frame, relative to the U-signal in the same line of Field −1. The phase of the U-signal at any other fixed reference point on the scanning line changes in the same manner, as shown in FIG. 1. Thus, the U-signal has a phase sequence with an eight-fields cycle.

The chrominance signals in two frames composed of Fields −4, −1, −2 and −3 and in the next two frames composed of Fields −4', −1', −2' and −3' show opposite phase relationships to each other when considering the pairs of corresponding fields. The two frames composed of Fields −4, −1, −2 and −3 are called an odd color frame, and the two frames composed of Fields −4', −1', −2' and −3' are called an even color frame.

Figure 2:
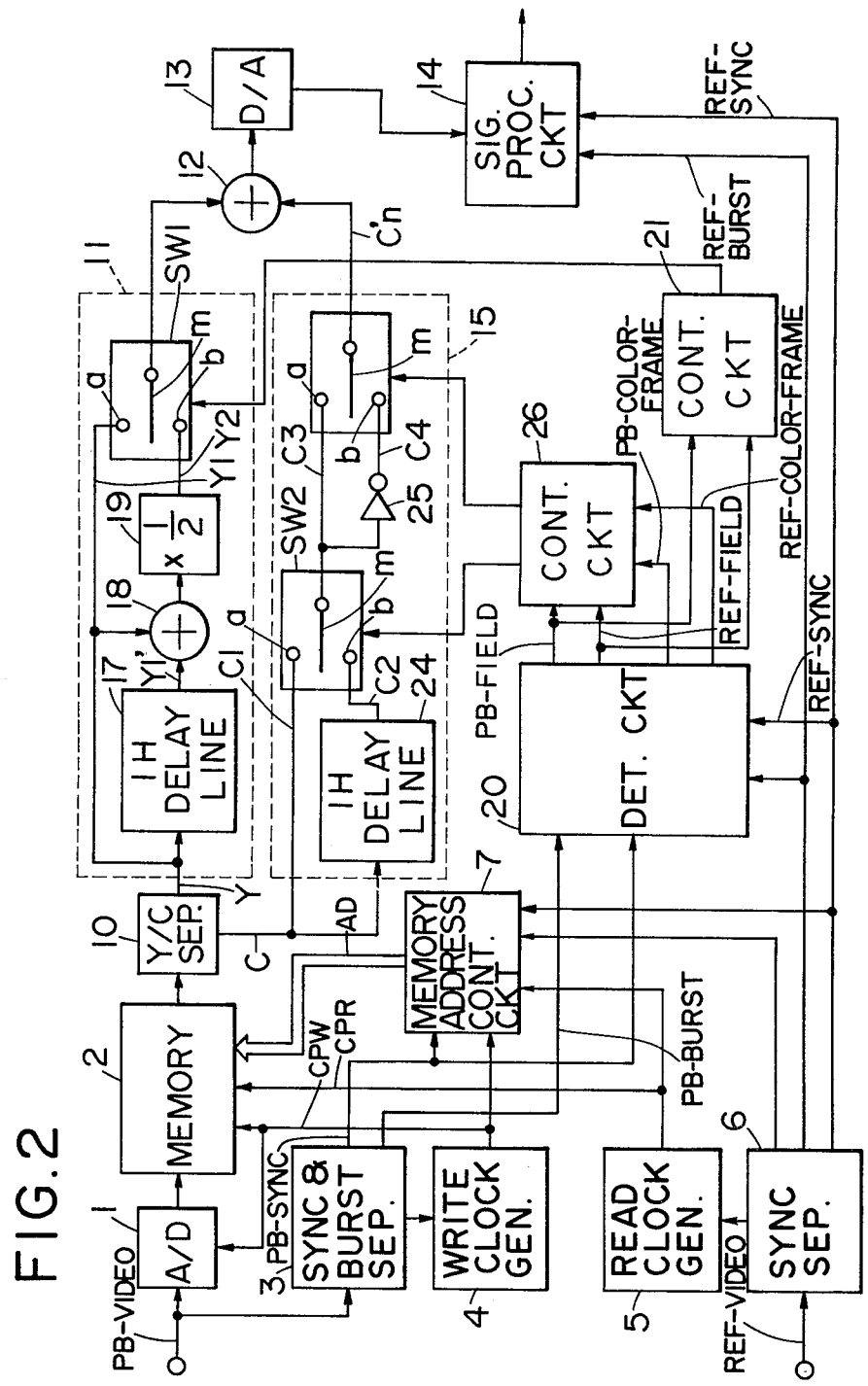
FIG. 2 is a block diagram of a video signal processing apparatus embodying this invention.

A video signal reproducing apparatus, such as a video disc recorder or helical scan video tape recorder (VTR) may have a special reproducing mode which, in the case of a VTR, employs a tape running speed different from the tape speed used for recording. Thus, for example, if the tape is at rest during reproducing, the same field signal is reproduced repeatedly, and a still video image is displayed on a monitor screen. In that case, a reproduced PAL color signal composed of a single field has to be re-synthesized in compliance with the sequence of the PAL color television system. FIG. 2 shows one example of a processing apparatus according to this invention for achieving the foregoing.

In FIG. 2, an incoming PAL color video signal (PB-VIDEO) reproduced by a VTR (Video Tape Recorder) is supplied to an analogue-to-digital (A/D) converter 1. The video signal converted to a digital signal is supplied to a memory 2. A part of the incoming reproduced video signal is supplied to a synchronizing signal and burst signal separator 3, in which a horizontal sync. signal, vertical synchronizing signal and a burst signal are separated from the incoming video signal. These separated signals are supplied to a write clock generator 4 which preferably includes an AFC circuit and APC circuit (not shown). A write clock pulse signal CPW having frequency three times the color sub-carrier frequency is formed in the generator 4. The write clock pulse signal CPW is supplied to A/D converter 1 and memory 2 so that the video signal in digital form is memorized in memory 2 in response to clock pulse CPW.

The memory 2 includes, for example, four shift register units each able to store 2 H periods (640 bits×2) of the video signal in 8-bit parallel form. Two of these four shift register units are selected to be written in, and to be read out from, in parallel. The read-out operation of memory 2 is effected in response to a read clock pulse signal CPR supplied from a read clock generator 5. The read clock pulse signal CPR is formed on the basis of a horizontal sync. signal and a burst signal separated from a reference video signal (REF-VIDEO) by a sync. separator 6 which receives the reference video signal. Accordingly, the read-out operation of memory 2 is carried out under the control of the reference video signal which does not include any time base error. Thus, any time base error included in the reproduced output of the VTR is removed from the output of memory 2.

The reference sync. signal separated in sync. separator 6 is supplied to a memory address control circuit 7, which also receives the PB-sync. signal and the write clock pulse CPW and the read clock pulse CPR from the sync. and burst separator 3, and clock generators 4 and 5, respectively. An address signal AD is formed in the memory address control circuit 7 on the basis of the sync. signals and the clock signals. The address signal AD is supplied to memory 2 to select the shift register units therein for performing the write-in and read-out operations. The A/D converter 1, memory 2, clock generators 4 and 5 and memory address control circuit 7 constitute a so-called "time base corrector."

The output from memory 2 in the form of an 8-bits parallel digital signal is supplied to a luminance/chrominance (Y/C) separator 10, in which the luminance signal Y and a chrominance signal C are separated from each other. The luminance signal Y is supplied to an adder 12 through a luminance signal compensating circuit 11. The chrominance signal C is supplied to the adder 12 through a chrominance signal compensating circuit 15. These compensating circuits 11 and 15 are provided to conform the reproduced video signal to the standard PAL signal sequence, that is, a video signal having the correct or standard PAL signal sequence is obtained from the output of adder 12. The digitized video signal from adder 12 is converted in a digital-to-analogue (D/A) converter 13 to an analogue video signal, to which a reference synchronizing signal (REF-SYNC) and a reference burst signal (REF-BURST) from sync. separator 6 are added in a signal processing circuit 14. The output of processing circuit 14 is led out as a composite PAL color video signal. The reference video signal to be supplied to separator 6 may be replaced by the output of a station sync. generator.

In the embodiment of FIG. 2, the luminance signal compensating circuit 11 is shown to include a 1 H delay line 17, an adder 18, an attenuator (19) having an attenuation factor of one-half, and a switch circuit $SW_1$. The luminance signal Y is directly supplied to a fixed contact a of switch $SW_1$ as a signal $Y_1$, and is also supplied to the adder 18 and the 1H delay line 17. A luminance signal $Y_1'$ passed through delay line 17 is supplied to adder 18 to be added therein to the signal $Y_1$. The output of adder 18 is supplied to attenuator 19 for reducing the signal level by one-half. A signal $Y_2$ having information represented by $Y_2=(Y_1+Y_1')/2$, that is, an interpolated luminance signal, is obtained from attenuator 19 and supplied to a contact b of switch circuit $SW_1$. The interpolated signal $Y_2$ is approximately equal to a video signal on a scanning line between two scanning lines at an interval of 1 H period. In other words, the interpolated signal $Y_2$ corresponds to the signal on an interlacing line in the next field which is between said two lines in the preceding field.

The switch circuit $SW_1$ is changed over by a control signal formed by detecting coincidence and dissidence of the reproduced video signal and the reference video signal with regard to an odd-even field sequence. The reproduced sync. signal (REF-SYNC) are supplied to a detecting circuit 20, in which a playback field identification signal (PB-FIELD) and a reference field identification signal (REF-FIELD) are suitably formed. These identification signals are supplied to a luminance signal control circuit 21 which provides a control signal for switch circuit $SW_1$. When the reproduced video signal coincides with the reference video signal in respect to the odd-even field sequence, a movable contact m of switch $SW_1$ is changed-over or moved to engage contact a. When the reproduced and reference video signals do not coincide with each other in respect to the odd-even sequence, the movable contact m is changed-over to engage the other contact b.

In the embodiment of FIG. 2, the chrominance signal compensating circuit 15 is shown to include a 1 H delay line 24, two switch circuits $SW_2$ and $SW_3$, and a phase inverter 25. The separated chrominance signal C is directly supplied to a contact a of switch $SW_2$ as a signal $C_1$ and signal C is also applied to delay line 24 from which a signal $C_2$ delayed by 1 H period is obtained. The signal $C_2$ is supplied to another contact b of switch $SW_2$. The signal $C_1$ or $C_2$ is selectively supplied through a movable contact m of switch $SW_2$ as a signal $C_3$ to a contact a of switch $SW_3$.

At the same time, the signal $C_3$ is supplied to another contact b of switch $SW_3$ through the phase inverter 25 as a signal $C_4$. A signal $C_n$ having the correct PAL signal sequence is obtained through a movable contact m of switch $SW_3$, and is fed to adder 12.

The switch circuits $SW_2$ and $SW_3$ in chrominance signal compensating circuit 15 are respectively changed-over in accordance with the field relationship of the reproduced color video signal and the reference color video signal. The detecting circuit 20 provides the playback field identification signal (PB-FIELD), a playback color frame identification signal (PB-COLOR-FRAME), the reference field identification signal (REF-FIELD) and a reference color frame identification signal (REF-COLOR-FRAME) to a chrominance signal control circuit 26. The control circuit 26 produces control signals for suitably controlling switches $SW_2$ and $SW_3$ so that one of the reproduced chrominance signal $C_1$, the delayed chrominance signal $C_2$ and the phase-inverted chrominance signal $C_4$ will be selected at any time in accordance with the detected relationship between the playback field and reference field so as to achieve compliance with the PAL signal sequence.

The details of components of the signal processing circuit shown generally in FIG. 2 will now be described with reference to FIGS. 3 through 5.

As shown in FIG. 4, the detecting circuit 20 may include a field number detecting circuit 28 for detecting playback field numbers, from the first to the fourth, in the reproduced video signal, and another field number detecting circuit 29 for detecting reference field numbers, from the first to the fourth, in the reference video signal. These detecting circuits 28 and 29 respectively generate a playback field odd-even identification signal (PB-FD)O/E and a reference field odd-even identification signal (REF-FD)O/E which are supplied to a change-over signal forming circuit 30. The circuit 30 produces a control signal for switch $SW_1$ which goes high when the signals (PB-FD)O/E and (REF-FD)O/E do not coincide with each other. When such control signal fed to switch $SW_1$ goes high, the movable contact m is engaged with contact b so that the interpolated luminance signal $Y_2$ is selected for transmission to adder 12.

For example, when the reference field is odd and the playback field is even, the reproduced video signals on an $(n-1)$-line and an n-line in the even field are interpolated to regenerate a video signal on an n-line for the odd field. In other words, the interpolative correction represented as $Y_n=(Y_{n-1}+Y_n)/2$ is carried out. Thus, the reproduced image on a monitor screen is prevented from shifting vertically, by a half-line interval corresponding to H/2, upward and downward alternately at every field, as would otherwise be the case when an even field track is repeatedly traced or scanned in a VTR.

In contrast with the above, when both the reference field and the playback field are even, the reproduced video signals on an n-line and an $(n+1)$-line in the odd field are interpolated to regenerate a video signal on an n-line for the even field. In other words, the interpolative correction represented as $Y_n=(Y_n+Y_{n+1})/2$ is carried out. The table of FIG. 5 shows the interpolative correction for the luminance signal and the phase sequence correction for the chrominance signal for various relationships of the reference field number and playback field number.

However, there is a problem in each interpolative correction $Y_n=(Y_n+Y_{n+1})/2$ indicated at (A) on FIG. 5. Each interpolative correction $Y_n=(Y_{n-1}+Y_n)/2$ indicated at (B) in FIG. 5 can be achieved in luminance signal compensating circuit 11 by processing a luminance signal $Y_n$ on an n-line and a luminance signal $Y_{n-1}$ on a preceding $(n-1)$-line, as the signal $Y_{n-1}$ can be delayed by 1 H period so as to be simultaneous with the signal $Y_n$. However, for each interpolation indicated at (A) on FIG. 5, it is impossible to make the succeeding signal $Y_{n+1}$ simultaneous with the signal $Y_n$ by means of signal delay. Accordingly, the read-out timing of memory 2 of FIG. 1 is controlled so that the signal $Y_{n+1}$, which succeeds by one line period the signal $Y_n$, is read out precedently by 1H period, that is, at the time of the n-line of the reference sync. signal. Thus, the correction $Y_n=(Y_n+Y_{n+1})/2$ is achieved on the basis of the signal $Y_{n+1}$ and the preceding signal $Y_n$ which is delayed to be simultaneous with the signal $Y_{n+1}$. The following tables show the processes for the interpolative corrections (A) and (B):

TABLE A

INTERPOLATIVE CORRECTION A in reference field: even & playback field: odd

| Reference line No. | n − 1 | n | n + 1 |
|---|---|---|---|
| Memory out | $Y_n$ | $Y_{n+1}$ | $Y_{n+2}$ |
| 1H delay | $Y_{n-1}$ | $Y_n$ | $Y_{n+1}$ |
| Interpolative correction | | $Y_n' = (Y_n + Y_{n+1})/2$ | |

TABLE B

INTERPOLATIVE CORRECTION B in reference field: odd & playback field: even

| Reference line No. | n − 1 | n | n + 1 |
|---|---|---|---|
| Memory Out | $Y_{n-1}$ | $Y_n$ | $Y_{n+1}$ |
| 1H delay | $Y_{n-2}$ | $Y_{n-1}$ | $Y_n$ |
| Interpolative correction | | $Y_n' = (Y_{n-1} + Y_n)/2$ | |

Figure 3:
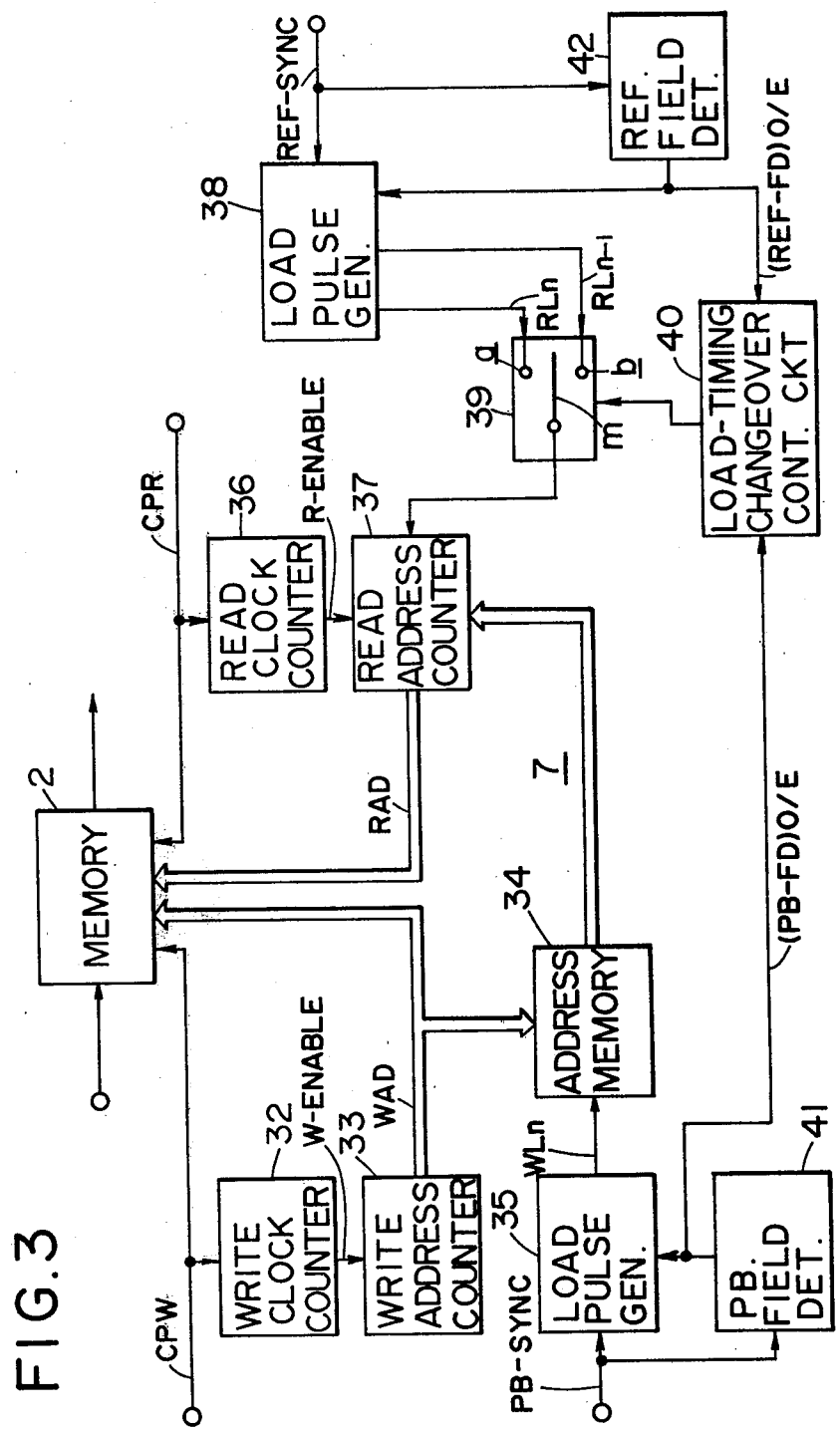
FIG. 3 is a block diagram of a memory address control circuit included in the apparatus of FIG. 2.

The memory 2 in FIG. 1 is controlled to perform the above interpolative corrections for the luminance signal by the memory address control circuit 7 which, as shown in FIG. 3, includes a write clock counter 32 receiving write clock pulse signal CPW from the write clock generator 4 of FIG. 1. The write clock counter 32 produces a write enable signal (W-ENABLE), which is fed to a write address counter 33. The address counter 33 generates a write address signal WAD which is a 3 bits digital signal for selecting, in sequence, the four units of 2H-registers in memory 2. The address signal WAD is supplied to memory 2, in which, as noted above, the output of A/D converter 1 of FIG. 1 is stored. The address signal WAD is also supplied to an address memory 34 having a load input terminal which receives a load pulse $WL_n$ from a load pulse generator 35, so that the write address signal WAD is loaded in address memory 34 at the timing of load pulse $WL_n$. The load pulse generator 35 receives the reproduced sync. signal (PB-SYNC) and generates the load pulse $WL_n$ at a predetermined location during each vertical blanking period.

During a read-out operation of memory 2, a read clock counter 36 receives the read clock pulse signal CPR from read clock generator 5 of FIG. 1, and produces a read enable signal (R-ENABLE) which is fed to a read address counter 37. The read address counter 37 produces a read address signal RAD which is used for selecting the first one of the register units of memory 2 to be read out in sequence. A data input terminal is provided on read address counter 37 to receive output data from address memory 34 in the write control part of the apparatus. The content of read address counter 37 is preset to the stored address in address memory 34 in response to a load pulse supplied to a load terminal of counter 37 at a predetermined time. Such load pulse is produced as follows:

A load pulse generator 38 receives the reference sync. signal (REF-SYNC), and produces a load pulse $RL_n$ at a predetermined time during each vertical blanking period of the reference vertical sync. signal. The load pulse $RL_n$ appears at the same time as the load pulse $WL_n$ produced in generator 35. Another load pulse $RL_{n-1}$ is produced by generator 38 so as to precede, by 1H period, each load pulse $RL_n$. These load pulses $RL_n$ and $RL_{n-1}$ are respectively supplied to contacts a and b of a switch circuit 39. One of the load pulses $RL_n$ and $RL_{n-1}$ is selected by a movable contact m of switch 39 for feeding to the load terminal of read address counter 37.

The switch circuit 39 is changed-over by a control signal from a load timing change-over control circuit 40, and such control signal is formed as follows:

The reproduced sync. signal (PB-SYNC) is supplied to a playback field detector 41 which provides a playback field odd-even detecting signal (PB-FD)O/E. The reference sync. signal (REF-SYNC) is supplied to a reference field detector 42 which provides a reference field odd-even detecting signal (REF-FD)O/E. These detecting signals (PB-FD)O/E and (REF-FD)O/E are supplied to load timing change-over control circuit 40 which, in response thereto, controls switch circuit 39. More particularly, when the playback field is even and the reference field is odd, that is, one of the relations between the playback and reference fields other than the relations indicated at (A) on FIG. 5, the output of circuit 40 causes the movable contact m of switch 39 to engage the contact a. Thus, the content of address counter 37 is preset to a stored address of the address memory 34 in response to the load pulse $RL_n$ which has the same video phase as the load pulse $WL_n$ for the write-in control.

On the other hand, when the playback field is odd and the reference field is even, which corresponds to the relation indicated at (A) on FIG. 5, the movable contact m of switch 39 is engaged with contact b. Accordingly, address counter 37 is then preset or loaded in response to the load pulse $RL_{n-1}$ which precedes by 1H period the load pulse $RL_n$. As a result, the signal $Y_{n+1}$ is read out from memory 2 earlier by 1 H period, that is, at the point in time of reference line n. The output of memory 2 is delayed by 1H period through the delay line 17 in luminance signal compensating circuit 11 to obtain the signal $Y_n$ simultaneously with the signal $Y_{n+1}$. Thus, each interpolative correction indicated at (A) on FIG. 5 is performed on the basis of the signals $Y_{n+1}$ and $Y_n$.

Next, the compensation for the chrominance signal will be described.

As is apparent from FIG. 1, for example, the phases of the U-signal and V-signal forming the chrominance signal on scanning line L7 in Field $-2$ coincide with phase-inverted versions of the U-signal and V-signal on line L8 in the Field $-1$. Accordingly, when the reference sync. signal shows Field $-1$ and the reproduced video signal shows Field $-2$, a correct chrominance signal for the Field $-1$ may be obtained by phase inversion of the reproduced chrominance signal preceding by 1 H period in Field $-2$. In that case, the movable contact m of switch $SW_2$ of FIG. 2 or FIG. 4 is engaged with contact b thereof and the movable contact m of switch $SW_3$ is engaged with contact b thereof, so that a chrominance signal $-C_{n-1}$ is obtained at the time of the n-line of the reference field. The signal $-C_{n-1}$ is subjected to a delay of 1H period and to a phase inversion. As a result, a correct chrominance signal for the reference Field $-1$ is regenerated to comply with the standard PAL signal sequence, even when Field $-2$ of the video signal is being reproduced.

FIG. 5 shows the compensated chrominance signals $C_n'$ regenerated through chrominance signal compensating circuit 15 for the various relationships between the reference field numbers F1 to F4 and the playback field numbers F1 to F4, which represent an odd color frame. When a playback field number coincides with a reference field number, the compensated chrominance signal $C_n'$ is equal to $C_n$, as there is no need for compensation. In that case, both switches $SW_2$ and $SW_3$ are engaged with their respective contacts a. When the playback field number is F1 and the reference number is F2, hereinafter referred as F1/F2, the compensated chrominance signal must be $-C_{n+1}$. In that case, as a signal $C_{n+1}$ is read out from memory 2 at the time of the n-line for the interpolative correction for the chrominance signal, the desired signal $-C_{n+1}$ can be regenerated merely through phase-inversion of the output of memory 2. In the case of F1/F3, the desired signal $-C_{n-1}$ is formed through a delay of 1H period and a phase-inversion. In the case of F1/F4, the desired signal $-C_n$ is formed through a delay of 1H period and a phase-inversion, as a signal $C_{n+1}$ is read out of memory 2 at the time of reference line n. In the case of F2/F1, the desired signal $-C_{n-1}$ is formd through a delay of 1 H period and a phase-inversion, as described above. In the case of F2/F3, the desired signal $-C_n$ is formed merely by a phase-inversion. In the cases of F2/F4 and F3/F4, the desired signal $+C_{n-1}$ is formed merely by a delay of 1H period. In the case of F3/F2, the signal $-C_n$ is obtained in the same manner as in the case of F1/F4. In the case of F3/F4, the desired signal $+C_{n+1}$ is formed without any compensation, as a signal $C_{n+1}$ is read out from memory 2 at the time of the reference line n. In the case of F4/F1, the desired signal $-C_n$ is formed in the same manner as in the case of F2/F3. In the case of F4/F2, the desired signal $-C_{n-1}$ is regenerated by a delay of 1H period and a phase-inversion. In the case of F4/F3, the desired signal $+C_{n-1}$ is obtained merely by a delay of 1 H period.

When the reproduced video signal represents an even color frame including Field $-1'$ to Field $-4'$, as shown in FIG. 1, switch SW$_3$ is controlled, in each instance, to form a signal which is phase inverted in respect to the corresponding compensated signal C$'_n$ of FIG. 5.

Referring again to FIG. 4, it will be seen that the reproduced sync. signal (PB-SYNC) and the reproduced burst signal (PB-BURST) are supplied to the field number detecting circuit 28. The phase of the burst signal is alternately inverted at every scanning line, so that the odd-even for each line can be defined therefrom. The odd-even for the field is identified by means of the playback sync. signal. Detecting signals PB$_1$ to PB$_4$ representing the playback field numbers F1 to F4, respectively, are obtained from field number detecting circuit 28 on the basis of the odd-even for the line and field. These detecting signals PB$_1$ to PB$_4$ are supplied to both a change-over signal forming circuit 45 for switch SW$_2$ and a change-over signal forming circuit 46 for switch SW$_3$. The reproduced sync. signal and the burst signal are supplied to a color frame setting circuit 47, from which a color frame odd-even identification signal (PB-CF)O/E is obtained and is fed to change-over signal forming circuit 46 for switch SW$_3$ through a contact b of a switch circuit 49. Alternatively, when a color frame signal (COLOR-FRAME) is obtained from the VTR, the signal is supplied to circuit 46 through another contact a of switch 49. In the same manner as above, the reference sync. signal (REF-SYNC) and the reference burst signal (REF-BURST) are supplied to the field number detecting circuit 29 and to a color frame setting circuit 48. Detecting signals REF1 to REF4 representing the reference field numbers F1 to F4 are detected by detecting circuit 29, and are fed to the change-over signal forming circuits 45 and 46 for switches SW$_2$ and SW$_3$. A reference color frame odd-even identification signal (REF-CF)O/E is obtained from color frame setting circuit 48, and is fed to change-over signal forming circuit 46 for switch SW$_3$.

Control signals S2 and S3 for changing-over switches SW$_2$ and SW$_3$ are formed in change-over signal forming circuits 45 and 46 in accordance with the signals PB1-PB4, (PB-CF)O/E, REF1-REF4 and (REF-CF)O/E. The changing-over operation of switches SW$_2$ and SW$_3$ achieves the chrominance signal compensation. The control signal S2 for engaging the movable contact m of switch SW$_2$ with the respective contact a thereof to select the signal C$_1$ is expressed by the following logical expression:

$$S2 = PB1(REF1+REF2) + PB2(REF2+REF3) \\ + PB3(REF3+REF4) + PB4(REF1+REF4) \quad (3).$$

The control signal S3 for engaging the movable contact m of switch Sw$_3$ with the respective contact a thereof to select the signal C$_3$ is expressed by the following logical expression:

$$S3 = \{PB1\cdot REF1+PB2(REF2+REF4) \\ +PB3(REF1+REF3+REF4) \\ +PB4(REF3+REF4)\} \oplus \{(PB-CF) \\ O/E \oplus (REF-CE)O/E\} \quad (4).$$

Where the symbol ⊕ represents exclusive "or"

It will be appreciated that, in accordance with this invention, the luminance signal can be compensated so that a reproduced image on a monitor screen will not shift frequency upward and downward due to the field interlacing, when the luminance signal of the reproduced color video signal has lost the odd-even field sequence, in the case where one of the record tracks on a magnetic tape in a VTR is repeatedly traced or where several tracks are skipped or omitted during playback at an arbitrary tape speed different from the recording speed. Further, the reproduced chrominance signal which lacks the correct field sequence can be compensated to comply with the PAL color signal sequence defined by a referencd sync. signal, so that chrominance demodulation can be correctly carried out in a monitor TV receiver.

Having described a specific preferred embodiment of the invention with reference to the accompanying drawings, it is to be understood that the invention is not limited to that precise embodiment, and that various changes and modifications may be effected therein by one skilled in the art without departing from the scope or spirit of the invention as defined in the appended claims.

What is claimed is:

1. Signal processing apparatus for a PAL color video signal reproduced from a video signal playback apparatus comprising:

playback color field signal generating means for generating a playback color field identification signal representative of a signal sequence of the reproduced PAL color video signal;

reference color field signal generating means for generating a reference color field identification signal having a standard signal sequence of a PAL color video signal;

luminance-chrominance separating means for separating luminance and chrominance signal components out of said reproduced PAL color video signal;

luminance signal correcting means for correcting a vertical shift of a reproduced image on a monitor screen;

chrominance signal correcting means for correcting a signal phase sequence of the chrominance signal components in compliance with a standard signal phase sequence of the PAL color video signal;

control signal generating means for generating a luminance control signal and a chrominance control signal by comparing said playback color field identification signal with said reference color field identification signal; and control means for controlling said luminance signal correcting means and said chrominance signal correcting means in response to said luminance control signal and said chrominance control signal, respectively.

2. Signal processing apparatus according to claim 1; wherein said luminance signal correcting means includes means for adding luminance signal components of two adjacent lines, and means for selecting an output of means for adding in response to said luminance control signal.

3. Signal processing apparatus according to claim 2; wherein said adding means includes a delay circuit having a delay time of one horizontal scanning interval, and an adder circuit; and wherein the reproduced luminance signal component is applied to said adder circuit both directly and through said delay circuit.

4. Signal processing apparatus according to claim 3; wherein said control signal generating means includes means for providing, in said luminance control signal, a field O/E coincidence signal when field O/E coincidence of the reference field and the playback-field is recognized, and said control means includes means for bypassing said luminance signal correcting means in response to said field O/E coincidence signal.

5. Signal processing apparatus according to claim 1; wherein said chrominance signal correcting means includes signal phase inverting means, signal delay means having a delay time of one horizontal scanning interval, and means responsive to said control means for selectively applying the reproduced chrominance signal components to said inverting means and delay means so that the chrominance signal components of the reproduced video signal are given the standard signal phase sequence of a PAL color video signal by delaying and/or phase inverting the reproduced chrominance signal components.

6. Signal processing apparatus according to claim 5; wherein said playback color field identification signal includes a field number from 1-4 and a color frame signal, and said reference color field identification signal includes a field number from 1-4 and a color frame signal.

7. Signal processing apparatus according to claim 5; wherein said signal phase inverting means and said signal delay means are connected in series, and selectively operable bypass circuits are provided around said signal phase inverting means and said signal delay means, respectively.

8. Signal processing apparatus according to claim 7; wherein said playback color field identification signal includes a playback field number from 1-4 and a playback color frame signal, and said reference color field identification signal includes a reference field number from 1-4 and a reference color frame signal.

9. Signal processing apparatus according to claim 8; wherein said control means includes means for controlling operation of the bypass circuit around said signal delay means on the basis of a comparison of the playback field number with the reference field number, and means for controlling operation of the bypass circuit around said signal phase inverting means on the basis of a comparison of the playback field number and playback color frame with the reference field number and the reference color frame.

10. Signal processing apparatus according to claim 9; wherein said luminance signal correcting means includes means for adding luminance components of two adjacent lines.

11. A method of processing a reproduced PAL color video signal which has a signal sequence different from a standard signal sequence of a PAL color video signal comprising:
generating a playback color field identification signal representative of said signal sequence of the reproduced PAL color video signal;
generating a reference color field identification signal having said standard signal sequence of a PAL color video signal;
separating luminance and chrominance signal components out of said reproduced PAL color video signal;
generating a luminance control signal and a chrominance control signal in correspondence to a comparison of said playback color field identification signal with said reference color field identification signal;
adding said luminance signal components for two adjacent lines for correcting a vertical drift of a reproduced image when indicated by said luminance control signal; and
correcting a signal phase sequence of said chrominance signal components for compliance with a standard signal phase sequence of the PAL color video signal when the need therefor is indicated by said chrominance control signal.

12. The method according to claim 11; wherein said correcting of the signal phase sequence is effected by selectively phase inverting and/or delaying the reproduced chrominance signal components as required by said chrominance control signal.

* * * * *